(12) United States Patent
Xing et al.

(10) Patent No.: US 12,396,029 B2
(45) Date of Patent: *Aug. 19, 2025

(54) CARRIER SET DETERMINATION METHOD AND DEVICE, STORAGE MEDIUM AND ELECTRONIC DEVICE

(71) Applicant: ZTE Corporation, Guangdong (CN)

(72) Inventors: Weimin Xing, Shenzhen (CN); Youxiong Lu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/081,237

(22) Filed: Dec. 14, 2022

(65) Prior Publication Data
US 2023/0115075 A1  Apr. 13, 2023

Related U.S. Application Data

(63) Continuation of application No. 16/987,326, filed on Aug. 6, 2020, now Pat. No. 11,540,318, which is a continuation of application No. PCT/CN2019/074116, filed on Jan. 31, 2019.

(30) Foreign Application Priority Data

Feb. 8, 2018 (CN) .......................... 201810151376.0

(51) Int. Cl.
*H04W 74/0808* (2024.01)
*H04W 56/00* (2009.01)
(Continued)

(52) U.S. Cl.
CPC ..... *H04W 74/0808* (2013.01); *H04W 56/001* (2013.01); *H04W 72/0453* (2013.01); *H04W 72/56* (2023.01); *H04W 92/18* (2013.01)

(58) Field of Classification Search
CPC ............. H04W 74/0808; H04W 72/56; H04W 56/001; H04W 72/0453; H04W 92/18
See application file for complete search history.

(56) References Cited

U.S. PATENT DOCUMENTS

2016/0165612 A1* 6/2016 Luo .................. H04L 5/001
370/329
2018/0332564 A1* 11/2018 Lee ................... H04L 67/12
(Continued)

FOREIGN PATENT DOCUMENTS

CN   105517159 A   4/2016
CN   106303918 A   1/2017
(Continued)

OTHER PUBLICATIONS

First Office Action for CN Appl. No. 201810151376.0, dated Nov. 26, 2020 (with English translation, 15 pages).
(Continued)

*Primary Examiner* — Michael J Moore, Jr.
(74) *Attorney, Agent, or Firm* — Foley & Lardner LLP

(57) ABSTRACT

Provided are a method and apparatus for determining a carrier set, a storage medium and an electronic device. The method includes following steps: a first carrier set corresponding to a predetermined logical channel group for a UE performing a sidelink transmission is determined, where the predetermined logical channel group includes one or more logical channels, and the logical channels in the predetermined logical channel group correspond to a same destination ID. The problem of lacking the method of determining a complete carrier set when the UE performs a sidelink transmission in the related art is solved, and a purpose of determining a carrier set required by the UE for determining the sidelink transmission is achieved.

20 Claims, 5 Drawing Sheets

(51) Int. Cl.
*H04W 72/0453* (2023.01)
*H04W 72/56* (2023.01)
*H04W 92/18* (2009.01)

(56) References Cited

U.S. PATENT DOCUMENTS

| | | | |
|---|---|---|---|
| 2019/0045465 A1* | 2/2019 | Lee | H04W 56/001 |
| 2019/0045521 A1* | 2/2019 | Hong | H04W 72/20 |
| 2019/0052446 A1* | 2/2019 | Cheng | H04W 72/0453 |
| 2020/0045719 A1 | 2/2020 | Wang et al. | |
| 2020/0221467 A1 | 7/2020 | Huang et al. | |
| 2020/0245327 A1* | 7/2020 | Tang | H04W 72/0453 |
| 2020/0287674 A1 | 9/2020 | Tang | |
| 2020/0322910 A1* | 10/2020 | Zhang | H04W 4/70 |
| 2020/0344721 A1* | 10/2020 | Xing | H04L 5/16 |
| 2021/0144529 A1 | 5/2021 | Yang | |

FOREIGN PATENT DOCUMENTS

| | | |
|---|---|---|
| CN | 106454687 A | 2/2017 |
| CN | 109644453 A | 4/2019 |
| CN | 109802821 A | 5/2019 |
| CN | 111149405 A | 5/2020 |

OTHER PUBLICATIONS

3GPP: "Status Report to TSG 1 Work plan related evaluation" 3GPP TSG RAN meeting #78; Dec. 21, 2017; RP-172339; Dec. 21, 2017 (17 pages).
CATT: "Discussion on synchronization for carrier aggregation in V2X Phase 2" 3GPP TSG RAN WG1 Meeting #91; R1-1720159; Dec. 1, 2017; Reno, USA (6 pages).
Extended European Search Report for EP Appl. No. 19751157.9, dated May 12, 2021 (12 pages).
Huawei et al., "Discussion on the Tx carrier selection for PC5 CA" 3GPP TSG-RAN WG2 Meeting#100, R2-1712751, Dec. 1, 2017, Reno, USA (6 pages).
Huawei et al.: "Discussion on how to deal with Destination L2 ID during Tx carrier selection" 3GPP TSG RAN WG2 Meeting #100; R2-1712744; Dec. 1, 2017 ;Reno, USA (6 pages).
Huawei, "V2X phase 2 based on LTE" 3GPP TSG RAN meeting #78, RP-172339, Dec. 21, 2017, Lisbon, Portugal (17 pages).
Intel Corporation: "On Carrier Aggregation for LTE v2V Sidelink Communication" 3GPP TSG RAN1 WG Meeting #88bis; R1-1705446; Apr. 7, 2017; Spokane, USA (9 pages).
International Search Report for PCT Appl. No. PCT/CN2019/074116 mailed Apr. 17, 2019 (with English translation, 5 pages).
Lenovo et al.: "Discussion on carrier selection details and handling Rx limited V2X UE" 3GPP TSG RAN WG2 Meeting #100; R2-1712947; Dec. 1, 2017; Reno, USA (4 pages).
Nokia et al.: "Discussion on synchronization for SL CA" 3GPP TSG-RAN WG1 Meeting #91; R1- 1720485; Dec. 1, 2017; Reno, USA (2 pages).
OPPO: "Carrier selection in CA-based eV2x" 3GPP TSG-RAN2 Meeting #100; R2-1712178; Dec. 1, 2017; Reno, USA (3 pages).
ZTE: "Discussion on carrier selection in PC5 CA" 3GPP TSG-RAN WG2 Meeting #100; R2-1713070; Dec. 1, 2017 Reno, USA (6 pages).

* cited by examiner

Determine a first carrier set corresponding to a predetermined logical channel group for a user equipment (UE) performing a sidelink transmission, where the predetermined logical channel group includes one or more logical channels, and the logical channels in the predetermined logical channel group correspond to a same destination identifier (ID) ⟿ S302

CARRIER SET DETERMINATION METHOD AND DEVICE, STORAGE MEDIUM AND ELECTRONIC DEVICE

CROSS REFERENCE TO RELATED APPLICATIONS

The present application claims priority under 35 U.S.C. § 120 as a continuation of U.S. patent application Ser. No. 16/987,326, issued as U.S. Pat. No. 11,540,318, titled "CARRIER SET DETERMINATION METHOD AND DEVICE, STORAGE MEDIUM AND ELECTRONIC DEVICE," filed Aug. 6, 2020, which claims the benefit of priority under 35 U.S.C. § 120 as a continuation of PCT Patent Application No. PCT/CN2019/074116, filed on Jan. 31, 2019, which claims priority to Chinese patent application no. 201810151376.0, filed on Feb. 8, 2019, the disclosure of each of which is incorporated herein by reference in its entirety which is incorporated herein by reference in its entirety.

TECHNICAL FIELD

The present disclosure relates to the field of communications and, in particular, to a method and apparatus for determining a carrier set, a storage medium and an electronic device.

BACKGROUND

In a sidelink communication system, sidelink resources are used for information transmission between user equipments (UEs). According to specific application scenarios and service types, sidelink communications include Device to Device (D2D) communication, Internet of Vehicles communication, including Vehicle to Vehicle (V2V), or Vehicle to Everything (V2X) communication, etc.

For the sidelink communications, such as the Internet of Vehicles communication, in order to regulate spectrum usage management in various regions and facilitate a receiver to select the correct spectrum to receive interested services, some configuration parameters for V2X service types are currently specified, including one or more frequencies/carriers that can be used by the service, and a destination identifier (ID) of an access layer corresponding to the service, etc. When the service enters the access layer for transmission, the access layer transmits the service on one or more logical channels. Data packets on these logical channels have a proximity service (ProSe) priority per packet (PPPP) and a destination ID corresponding to the service.

In the sidelink communication system, when a service needs to be transmitted between UEs, service data between the UEs is not forwarded through a network side, but is directly transmitted to a target UE by a data source UE through a sidelink. FIG. 1 is a structural diagram of a sidelink communication according to the related art. In addition, according to a method for acquiring communication resources, the sidelink communications can be divided into two types of communication modes. In a first type of mode, resources for sending sidelink signals by the UE come from scheduling of a base station. In a second type of mode, the UE autonomously selects the communication mode of the resources in a configured or pre-configured resource pool according to a resource selection strategy. The resource selection strategy mainly includes a sensing mechanism, a partial sensing mechanism and a random selection mechanism.

With the increase of demand of direct connection communication in the Internet of Vehicles, the requirements of the market on the sidelink communication system are continuously increasing. For example, in order to increase rate or reliability, it is necessary that the sidelink communication system can support carrier aggregation (CA), i.e., multiple carriers are used for parallel transmission, and the parallel here can be simultaneous or time-sharing. However, for the sidelink to use the CA for communication, a problem to be solved is which carriers are selected for communication.

With the discussion for sidelink CA, a new method or process of carrier selection needs to be determined. At this stage, many factors affecting the carrier selection are discussed, including a channel busy ratio (CBR) of the carrier, a service type of the data to be transmitted, data PPPP, and capabilities of the UE. However, at present, there is no complete definition of what the final process of the carrier selection is and how the above factors act in the process of the carrier selection.

No efficient solution has been provided to solve the problem of lacking a method for determining a complete carrier set when the UE performs a sidelink transmission in the related art.

SUMMARY

Embodiments of the present disclosure provide a method and apparatus for determining a carrier set, a storage medium and an electronic device to at least solve the problem of lacking a method for determining a complete carrier set when a UE performs a sidelink transmission in the related art.

According to an embodiment of the present disclosure, a method for determining a carrier set is provided. The method includes following steps: a first carrier set corresponding to a predetermined logical channel group for a UE performing a sidelink transmission is determined, where the predetermined logical channel group includes one or more logical channels, and the logical channels in the predetermined logical channel group correspond to a same destination ID.

According to another embodiment of the present disclosure, an apparatus for determining a carrier set is provided. The apparatus includes a determination module, which is configured to determine a first carrier set corresponding to a predetermined logical channel group for a UE performing a sidelink transmission, where the predetermined logical channel group includes one or more logical channels, and the logical channels in the logical channel group correspond to a same destination ID.

According to another embodiment of the present disclosure, a storage medium is provided. The storage medium is configured to store computer programs, where the computer programs, when are executed, execute steps of any one of the method embodiments described above.

According to another embodiment of the present disclosure, an electronic device is further provided. The electronic device includes a memory and a processor. The memory is configured to store computer programs and the processor is configured to execute the computer programs for executing the steps of any one of the method embodiments described above.

According to the embodiments of the present disclosure, the carrier set corresponding to the predetermined logical channel group is determined to be applied to the UE for performing the sidelink transmission. Therefore, the problem of lacking a method for determining a complete carrier set when the UE performs a sidelink transmission in the related art is solved, and a purpose of determining a carrier set required by the UE for performing the sidelink transmission is achieved.

BRIEF DESCRIPTION OF DRAWINGS

The drawings described herein are used for providing a further understanding of the present disclosure, and form a part of the present application. The exemplary embodiments and descriptions thereof in the present disclosure are used for explaining the present disclosure and do not constitute an improper limitation on the present disclosure. In the drawings.

DETAILED DESCRIPTION

The present disclosure will be described hereinafter in detail with reference to the drawings and in conjunction with embodiments. It should be noted that if not in collision, the embodiments and features therein in the present application can be combined with each other.

It should be noted that the terms "first", "second" and the like in the description, claims and above drawings of the present disclosure are used for distinguishing between similar objects and are not necessarily used for describing a particular order or sequence.

Embodiment One

Figure 1:
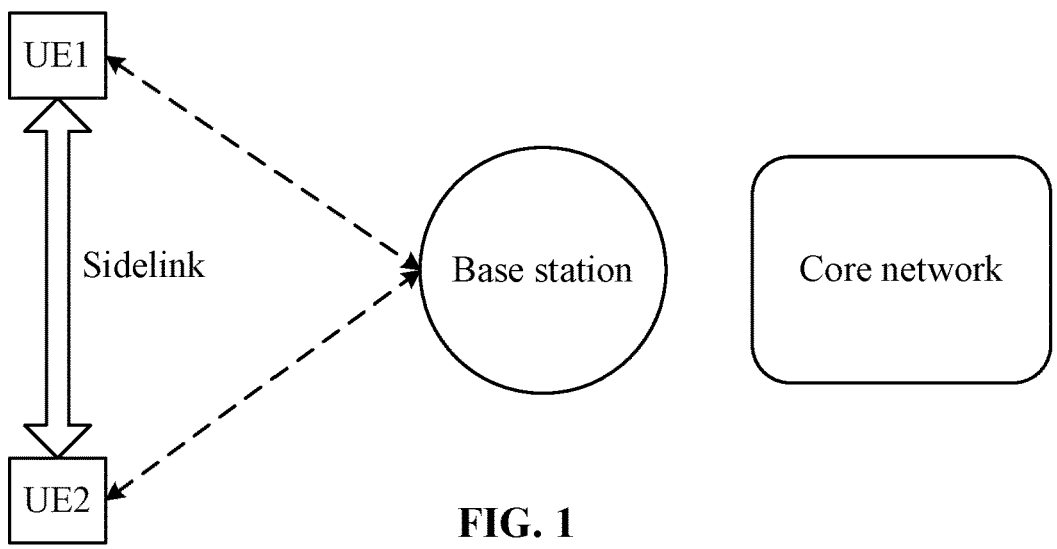
FIG. 1 is a structural diagram of a sidelink communication according to an embodiment of the present disclosure.
Figure 2:
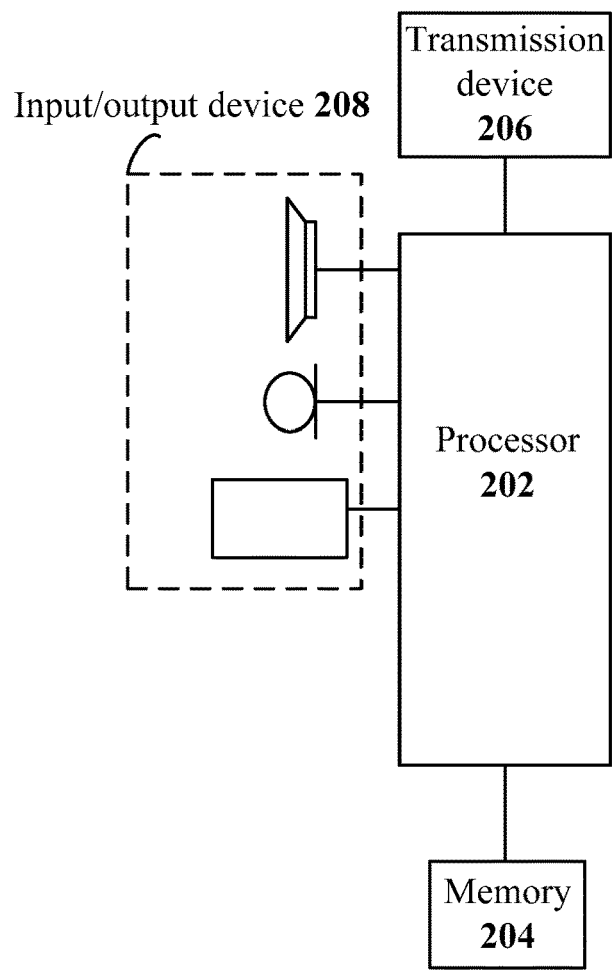
FIG. 2 is a block diagram of a hardware structure of a mobile terminal of a method for determining a carrier set according to an embodiment of the present disclosure.

A method embodiment provided by the embodiment one of the present application may be executed in a mobile terminal, a computer terminal or other similar computing devices. Taking the method embodiment to be executed in the mobile terminal as an example, FIG. 2 is a block diagram of a hardware structure of a mobile terminal for a method for determining a carrier set according to an embodiment of the present disclosure. As shown in FIG. 2, a mobile terminal 20 may include one or more (only one is shown in FIG. 2) processors 202 (the processors 202 may include, but are not limited to, processing devices such as a microcontroller unit (MCU) and a field programmable gate array (FPGA)) and a memory 204 configured to store data. Optionally, the above mobile terminal may further include an input/output device 208 and a transmission device 206 configured to implement a communication function. It should be understood by those skilled in the art that the structure shown in FIG. 2 is merely illustrative and not intended to limit the structure of the above mobile terminal. For example, the mobile terminal 20 may further include more or fewer components than the components shown in FIG. 2, or may have a different configuration than the configuration shown in FIG. 2.

The memory 204 may be configured to store computer programs, such as software programs and modules of an application, or computer programs corresponding to the method for determining the carrier set in the embodiment of the present disclosure. The processor 202 executes the computer programs stored in the memory 204 to execute various functional applications and data processing, that is, to implement the method described above. The memory 204 may include a high-speed random access memory, or may further include a nonvolatile memory such as one or more magnetic storage devices, flash memories or other nonvolatile solid-state memories. In some examples, the memory 204 may further include memories remotely disposed with respect to the processors 202. These remote memories may be connected to the mobile terminal 20 via a network. Examples of the above network include, but are not limited to, the Internet, an intranet, a local area network, a mobile communication network and a combination thereof.

The transmission device 206 is configured to receive or send data via a network. Specific examples of the above network may include a wireless network provided by a communication provider of the mobile terminal 20. In one example, the transmission device 206 includes a network interface controller (NIC), which may be connected to other network devices via a base station, thereby communicating with the Internet. In an example, the transmission device 206 may be a radio frequency (RF) module, which is configured to communicate with the Internet in a wireless way.

Embodiment Two

Figures 3, 4:
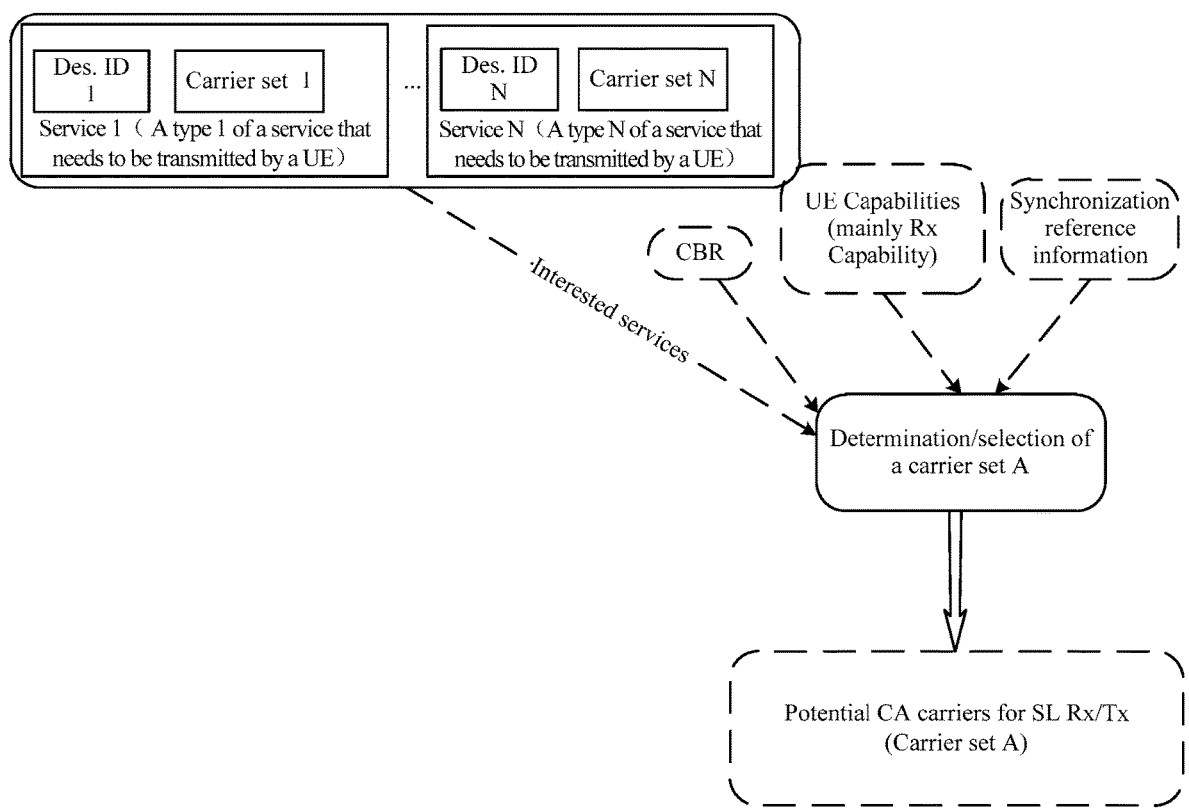
FIG. 3 is a flowchart of a method for determining a carrier set according to an optional embodiment of the present disclosure.
FIG. 4 is a schematic diagram of a method for determining (or configuring) a carrier set A used by a UE for a sidelink transmission according to an embodiment of the present disclosure.

The present embodiment provides a method for determining a carrier set executed on the mobile terminal described above. FIG. 3 is a flowchart of a method for determining a carrier set according to an embodiment of the present disclosure. As shown in FIG. 3, the method includes steps described below.

In step S302, a first carrier set corresponding to a predetermined logical channel group for a UE performing a sidelink transmission is determined, where the predetermined logical channel group includes one or more logical channels, and the logical channels in the predetermined logical channel group correspond to a same destination ID.

Optionally, the above step may be executed by a terminal, and the above destination ID may be, but limited to, a ProSe destination ID or a layer 2 destination ID.

In the above embodiment, the carrier set corresponding to the logical channel group is determined, and logical channels in the logical channel group respectively correspond to the same destination ID. Therefore, the problem of lacking a method for determining a complete carrier set when the UE performs the sidelink transmission in related art may be solved, and the purpose of determining a carrier set required by the UE for performing the sidelink transmission is achieved.

In an optional embodiment, the step in which the first carrier set corresponding to the predetermined logical channel group for the UE performing the sidelink transmission is determined includes following steps: a second carrier set for the UE performing the sidelink transmission is determined; the first carrier set is determined from the second carrier set. In this embodiment, the first carrier set is a subset of the second carrier set.

In an optional embodiment, the step in which the second carrier set for the UE performing the sidelink transmission is determined includes following steps: the second carrier set is determined according to at least one of: a type of a service that needs to be transmitted by the UE (in the embodiment of the present disclosure, the type of the service may also be called as the service, an application, or an application type, which are equal and similar below); transmission capability of the UE; a type of a service that a carrier is capable of carrying; a CBR on the carrier; synchronization reference information used by the carrier, where the synchronization reference information includes a synchronization reference, a synchronization reference source or a synchronization configuration; or the second carrier set from a base station is received. In this embodiment, the carrier set is configured with a granularity of the logical channel group or the destination ID. Multiple factors (a CBR (the CBR on the carrier), synchronization (the synchronization reference information), a service (the type of the service that needs to be transmitted by the UE), the transmission capability of the UE) are considered to determine the carrier set. Carriers are selected from candidate carriers as a carrier set A (corresponding to the second carrier set) which needs to satisfy at least one of the following principles: 1) the UE selects carriers from multiple carrier sets corresponding to multiple services (corresponding to the type of the service that needs to be transmitted by the UE) to be transmitted as carriers in the carrier set A; 2) the carrier set A of the UE for the sidelink CA does not exceed the capability of the UE (corresponding to the transmission capability of the UE); 3) the UE considers the CBR (corresponding to the CBR on the carrier) of each carrier, such as preferentially selecting a carrier with a lower CBR; 4) the UE considers the synchronization (corresponding to the synchronization reference information used by the carrier) of carriers, where the carriers used for the sidelink CA for transmission use the same synchronization reference, the same synchronization reference source or the same synchronization configuration. In this embodiment, the base station may determine the second carrier set in a following manner: information (including the type of the service that needs to be transmitted by the UE, the transmission capability of the UE, the type of the service that the carrier is capable of carrying, the CBR on the carrier, and the synchronization reference information used by the carrier in the above embodiment) reported by the UE is received, and the base station determines the second carrier set according to the information reported by the UE.

In an optional embodiment, each carrier in the second carrier set uses the same synchronization reference, the same synchronization reference source or the same synchronization configuration.

In an optional embodiment, the synchronization configuration includes a highest priority synchronization reference type of the carrier, a synchronization reference source type of the carrier or a synchronization reference priority of the carrier.

In an optional embodiment, the step in which the second carrier set is determined according to at least one of: the type of the service that the carrier is capable of carrying, the CBR on the carrier, and the synchronization reference information used by the carrier, and according to the service that needs to be transmitted by the UE and the transmission capability of the UE, includes following steps: carrier sets respectively corresponding to services that need to be transmitted by the UE are taken as a first candidate carrier set; carriers in the first candidate carrier set are ordered according to at least one of the type of the service that the carrier is capable of carrying, the CBR on the carrier, and the synchronization reference information used by the carrier; according to the transmission capability of the UE, a predetermined number of carriers are selected from the ordered first candidate carrier set in sequence as the second carrier set. The specific configuration manner in this embodiment is applicable to a terminal side or a base station side, i.e., the terminal may determine the second carrier set through the above manner, and the base station may also determine the second carrier set through the above manner.

How to determine the second carrier set will be described hereinafter in conjunction with specific embodiments.

Specific Embodiment One

This embodiment is used for describing a method for determining (or configuring) a carrier set A (corresponding to a second carrier set in this embodiment) used by the UE for a sidelink transmission.

The carrier set A is a carrier set that the UE may use for the sidelink CA transmission. Unless otherwise specified, the transmission in this embodiment includes receiving and sending. Optionally, the carrier set A may be configured, and the carriers in the set A may be used for the sending of the sidelink CA, or the receiving of the sidelink CA. The UE performs operations such as sensing, receiving data, and sending data before the carriers in the carrier set A are sent. Selection of carriers in the carrier set A is related to a variety of factors, including the type of the service (service type) that the UE wants to transmit, the transmission capability of the UE (UE capabilities), and the CBR on each carrier, the synchronization reference/the synchronization reference source used on each carrier, or the synchronization reference configuration (also known as synchronization configuration) on each carrier, which includes a highest priority synchronization reference (source) type of the carrier, or a synchronization reference priority of the carrier. As shown in FIG. 4, the role of each factor is as follows.

(1) The service (corresponding to the type of the service that needs to be transmitted by the UE): each service corresponds to a set of frequencies/carriers that are capable of performing the sidelink transmission. Without special description, the carriers in the embodiment of the present disclosure are generally equivalent to the frequencies/carriers. If the UE wants to use the CA to transmit a service, the UE should select one or more carriers in the carrier set corresponding to the service. If the UE transmits multiple services at the same time, the UE should select carriers from multiple carrier sets corresponding to multiple services as the carriers in the carrier set A. In specific implementations, different services have different priority levels, and different carriers of the same service may also have different priority levels. The UE considers these priority levels for carrier selection when selecting the carriers. For example, a higher priority carrier for a higher priority service may be preferentially selected.

(2) The UE capabilities (corresponding to the transmission capability of the UE): the UE capabilities mainly include receiving capability of the UE. Before the UE sends in a sensing-based mode, the UE performs sensing to the carrier, and the number of carriers that the UE is able to simultaneously sense is limited by the receiving capability of the UE, so the number of carriers in carrier set A should not exceed the receiving capability of the UE. Optionally, the sending capability of the UE may also be considered, including determining the carriers in the carrier set A according to factors such as the number of carriers that the UE may transmit simultaneously, frequency band combinations that the UE may send simultaneously, and whether the UE may send on discontinuous carriers. For example, the number of carriers that the UE may send simultaneously is 2 and it is not supported that the carriers are switched between two frequency bands; the receiving capability is 8 and it is supported that the carriers are received on two frequency bands (assuming that one frequency band includes 4 carriers). In this case, the carrier set A may be configured to be 4 carriers on a certain frequency band, or a size of the carrier set A is limited to no more than 2 according to the transmission capability of 2.

(3) The CBR (corresponding to the CBR on the carrier): for each candidate carrier, channel busy status is different on each carrier. To avoid congestion, the UE should select a carrier with a lower CBR as the carrier in the carrier set A. The CBR of the candidate carrier may be measured by the UE (the UE may perform CBR measurement on each carrier in a time-sharing manner, and the number of the candidate carriers may be greater than the receiving capability of the UE), or may be acquired from the network side or other equipments.

(4) The Synchronization reference/synchronization reference source/synchronization configuration (corresponding to the above synchronization reference information): for transmission of multiple carriers, if timings of the multiple carriers are not aligned, i.e., when the synchronization reference, the synchronization reference source or the synchronization configuration is different, the channel usage efficiency will be affected and the complexity of the UE is increased. Therefore, the carrier used by the sidelink CA for sending uses the same synchronization reference, the same synchronization reference source or the same synchronization configuration; the carrier used by the sidelink CA for receiving uses the same synchronization reference, the same synchronization reference source or the same synchronization configuration. Thus, the generally carriers in the carrier set A should use the same synchronization reference, the same synchronization reference source or the same synchronization configuration. Alternatively, the carriers in carrier set A should have the same synchronization configuration. The synchronization configuration includes the highest priority synchronization reference (source) type of the carrier, or the synchronization reference priority of the carrier.

When the carrier set A is determined, it is necessary to meet at least one of following principles:
1) the UE selects carriers from multiple carrier sets corresponding to multiple services to be transmitted as the carriers (corresponding to the type of the service that needs to be transmitted by the UE) in the carrier set A;
2) the carrier set A of the UE for the sidelink CA does not exceed the UE capabilities (corresponding to the transmission capability of the UE);
3) the UE considers the CBR of each carrier, for example, the carrier with a lower CBR is preferentially selected (corresponding to the CBR on the carrier);
4) the UE considers the synchronization of the carriers, where the carriers used by the sidelink CA for transmission use the same synchronization reference, the same synchronization reference source or the same synchronization configuration (corresponding to the synchronization reference information used by the carrier).

The specific method for determining the carrier set A is as follows:
1) the UE determines multiple carrier sets corresponding to multiple services to be transmitted, and the carriers in these sets are all candidate carriers;
2) the UE orders the candidate carriers, where factors that affect the ordering include: the type of the service that the carrier is capable of carrying, the CBR, the synchronization reference information, etc.
3) under the premise of not exceeding the UE capabilities, carriers which is ordered at front in the ordered candidate carriers are intercepted as the carrier set A (corresponding to the second carrier set).

Specific Embodiment Two

This embodiment is used for describing another method for determining (or configuring) the carrier set A (corresponding to the second carrier set) used by the UE for the sidelink transmission.

Figure 5:
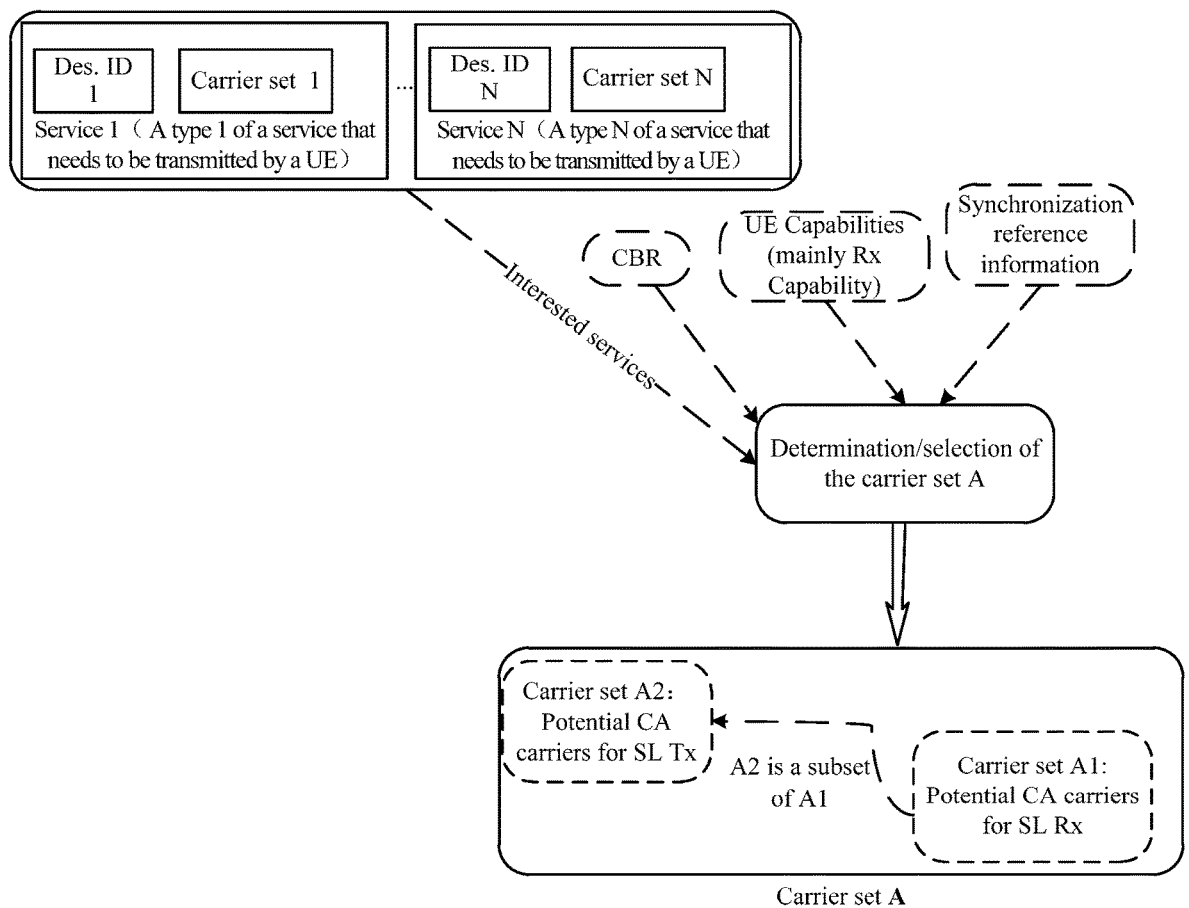
FIG. 5 is a schematic diagram of another method for determining (or configuring) a carrier set A used by a UE for a sidelink transmission according to an embodiment of the present disclosure.

In this specific embodiment, the configured carrier set A includes a carrier set A1 that may be used by the sidelink CA for the reception, and a carrier set A2 that may be used by the sidelink CA for the sending. In general, A2 is a subset of A1. The UE performs operations such as sensing and sending before sending on the carriers in the set A2, and the UE performs operations such as receiving before sending on the carriers in the set A1, as shown in FIG. 5. Similar to the specific embodiment one, the selection of the carriers in the carrier set A (including A1 and A2) is related to a variety of factors, including the type of the service (the service type) that the UE wants to transmit, the transmission capability of the UE (the UE capabilities), the CBR, and the synchronization reference/the synchronization reference source used on each carrier, where specific principles and processes are consistent with determination principles of the carrier set A in the specific embodiment one.

In addition, as applicable to the specific embodiment one and the specific embodiment two, the carrier set A may be determined by a higher layer of a protocol stack and configured to a lower layer. Optionally, the carrier set A may be determined by the higher layer of the protocol stack and configured to the lower layer of the UE through an internal interface. Generally, the carrier set A is determined by a Radio Resource Control (RRC) layer and configured to the lower layer. The lower layer may be a media access control (MAC) layer or a physical (PHY) layer. The carrier set A may also be determined by the base station and configured to the UE through signaling.

In an optional embodiment, the step in which the first carrier set is determined from the second carrier set described above includes following steps: a second candidate carrier set corresponding to the predetermined logical channel group is determined according to carrier sets corresponding to service types included in the predetermined logical channel group; a subset of an intersection set of the second carrier set and the second candidate carrier set is determined as the first carrier set. In this embodiment, a carrier set C (corresponding to the second candidate carrier set) corresponding to the logical channel group may be determined according to the service types included in the logical channel group. An intersection set of the carrier set A (corresponding to the second carrier set) and the carrier set B is taken in the above embodiment, thereby the obtained carrier set B (corresponding to the first carrier set) is used as the carrier set corresponding to the logical channel group.

In an optional embodiment, the step in which the second candidate carrier set corresponding to the predetermined logical channel group is determined according to the carrier sets corresponding to the service types included in the predetermined logical channel group includes one of following steps: if the destination ID corresponding to the predetermined logical channel group corresponds to one or more service types, and the one or more service types correspond to a same carrier set, the second candidate carrier set is determined as a carrier set (or a subset of the carrier set) corresponding to any one of the service types included in the predetermined logical channel group; if the destination ID corresponding to the predetermined logical channel group corresponds to multiple service types, and an interaction set of the carrier sets of the multiple service types included in the predetermined logical channel group is a nonempty set, the second candidate carrier set is determined as the interaction set (or a subset of the interaction set) of the carrier sets of the multiple service types included in the predetermined logical channel group; or if the destination ID corresponding to the predetermined logical channel group corresponds to multiple service types, the second candidate carrier set is determined as a union set (or a subset of the union set) of the carrier sets of the multiple service types included in the predetermined logical channel group. In this embodiment, a carrier set (corresponding to the first carrier set) that a logical channel group or the destination ID may use is determined through an interaction set of the carrier set A (corresponding to the second carrier set) configured by per UE and the carrier set C (corresponding to the second candidate carrier set) determined by per logical channel group or the destination ID. The embodiment is described below with reference to specific embodiments.

Specific Embodiment Three

In this specific embodiment, a method for determining (or configuring) a carrier set $B_i$ (corresponding to the first carrier set) corresponding to an i-th logical channel group used by a UE for a sidelink transmission is described. Logical channels in a logical channel group have the same destination ID, i.e., a logical channel group i corresponds to only one destination $ID_i$. In this embodiment, it is also assumed that determining (or configuring) the carrier set $B_i$ corresponding to the i-th logical channel group used by the UE for the sidelink transmission is equivalent to determining (or configuring) the carrier set $B_i$ corresponding to the destination $ID_i$ used by the UE for the sidelink transmission. A service type corresponds to a destination ID and a carrier set capable of transmitting the service. Meanwhile, different services may correspond to the same destination ID and carrier sets corresponding to different services may be the same, partially the same or not intersecting. The embodiment is described below with reference to specific correspondence relations.

Method one: the service type and the destination ID are defined to be in one-to-one correspondence, or only service types corresponding to the same carrier set may correspond to the same destination ID. The step in which the carrier set $B_i$ (corresponding to the first carrier set) corresponding to the destination $ID_i$ used by the UE for the sidelink transmission includes following steps: in the condition that one or more service types correspond to the destination $ID_i$, if the number of the corresponding service types is N, the carrier set corresponding to the destination $ID_i$ or a j-th service included in a logical channel group i is $C_{i,j}$; as described above, if the carrier sets corresponding to all N services are the same, candidate carrier sets corresponding to destination $ID_i$ are $C_i = C_{i,1} = C_{i,2} \ldots = C_{i,N}$ (corresponding to the second candidate carrier set); it is determined (or configured) that the carrier set $B_i$ (corresponding to the first carrier set) corresponding to the destination $ID_i$ used by the UE for the sidelink transmission belongs to or is equal to an interaction set of the candidate carrier set $C_i$ (corresponding to the second candidate carrier set) and the determined (or configured) carrier set A (corresponding to the second carrier set) used by the UE for the sidelink transmission, i.e., $B_i \subseteq (C_i \cap A)$.

Method two: multiple services may correspond to the same destination ID, but the multiple services may correspond to the same destination ID only if the intersection set of the carrier sets of the multiple services is not empty.

The step in which the carrier set $B_i$ (corresponding to the first carrier set) corresponding to the destination $ID_i$ used by the UE for the sidelink transmission is determined includes following steps: under the condition that one or more service types correspond to the destination $ID_i$, if the number of the corresponding service types is N, the carrier set corresponding to the destination $ID_i$ or the j-th service included in the logical channel group i is $C_{i,j}$; it is determined that the candidate carrier set corresponding to the destination $ID_i$ is $C_i$ (corresponding to the second candidate carrier set) which belongs to the interaction of carrier sets of services, optionally, $C_i \subseteq (C_{i,1} \cap C_{i,2} \ldots \cap C_{i,N})$, and similarly, the carrier set $B_i$ is $B_i \perp (C_i \# A)$.

Figure 6:
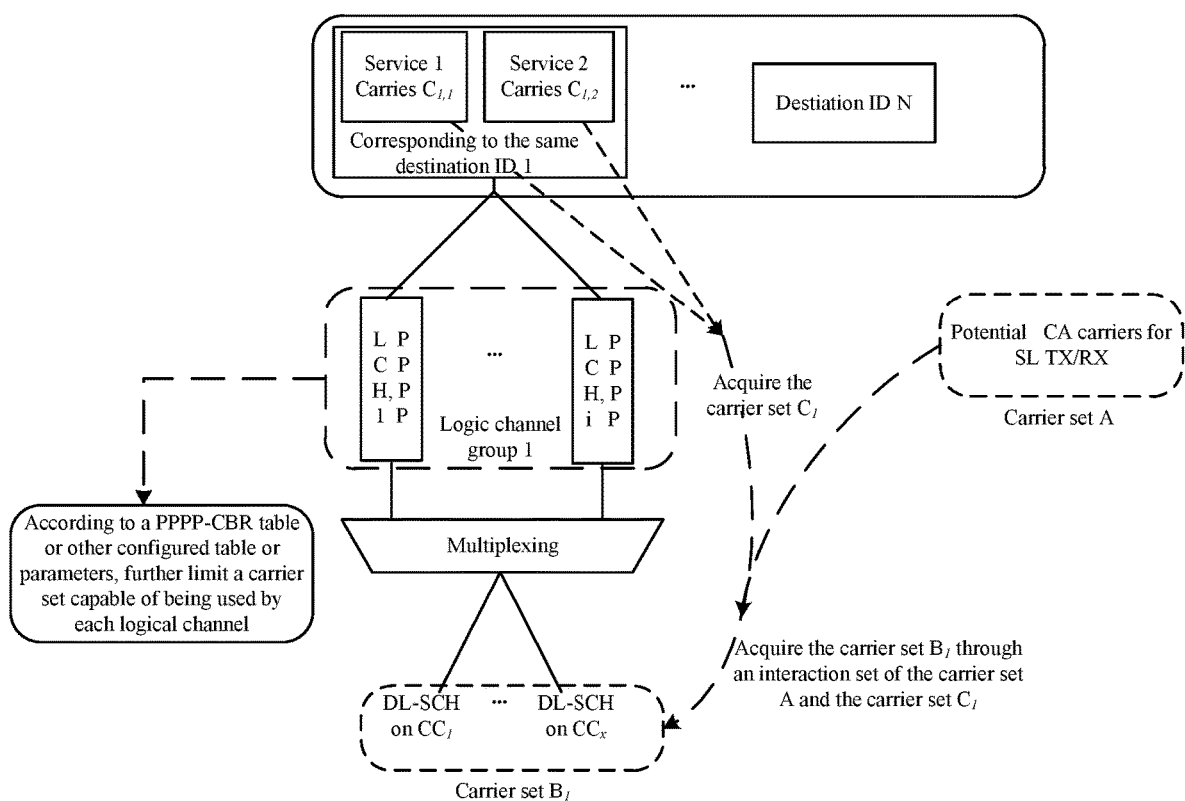
FIG. 6 is a schematic diagram of a method for determining (or configuring) a carrier set $B_i$ corresponding to an i-th logic channel used by a UE for a sidelink transmission according to an embodiment of the present disclosure.

Method three: multiple services may correspond to the same destination ID, and the carrier sets of the multiple services may be the same, completely different, or partially the same. As shown in FIG. 6, the step in which the carrier set $B_i$ (corresponding to the first carrier set) corresponding to the destination $ID_i$ used by the UE for the sidelink transmission is determined (configured) includes following steps: under the condition that one or more service types correspond to the destination $ID_i$, if the number of the corresponding service types is N, the carrier set corresponding to the destination $ID_i$ or the j-th service included in the logical channel group i is $C_{i,j}$; it is determined that the candidate carrier set corresponding to destination $ID_i$ is $C_i$ (corresponding to the second candidate carrier set) which belongs to a union set of the carrier sets of the services, optionally, $C_i \subseteq (C_{i,1} \cup C_{i,2} \ldots \cup C_{i,N})$, and similarly, the carrier set $B_i$ (corresponding to the first carrier set) is $B_i \subseteq (C_i \cap A)$.

Specific Embodiment Four

This embodiment is used for describing another method for determining (or configuring) the carrier set $B_i$ corresponding to the i-th logical channel group used by the UE for the sidelink transmission. Logical channels in one logical channel group have the same destination ID, and different logical channel groups may correspond to the same destination ID. Even if different logical channel groups correspond to the same destination ID, different logical channel groups may still correspond to different carrier sets $B_i$ (corresponding to the first carrier set).

One or more service types are carried on a logical channel group i. If the number of corresponding service types is N, the carrier set corresponding to a j-th service included in the logical channel group i is $C_{i,j}$. Here, if carrier sets corresponding to all N services are the same, a candidate carrier set corresponding to the logical channel group i is $C_i = C_{i,1} = C_{i,2} \ldots = C_{i,N}$ (corresponding to the second candidate carrier set), and the carrier set $B_i$ (corresponding to the first carrier set) corresponding to the logical channel group i used by the UE for the sidelink transmission is determined (or configured) to belong to or be equal to the intersection set of the candidate carrier set $C_i$ (corresponding to the second candidate carrier set) and the determined (or configured) carrier set A (corresponding to the second carrier set) used by the UE for the sidelink transmission, i.e. $B_i \subseteq (C_i \cap A)$.

If multiple logical channel groups correspond to the same destination ID, theoretically data of the multiple logical channel groups may be multiplexed in the same or multiple protocol data units (PDUs), and one PDU will be carried on one carrier. However, when the multiple logical channel groups are multiplexed, for each logical channel group, it must be satisfied that the carrier on which the PDU carrying a data packet of the logical channel group i belongs to the carrier set $B_i$ (corresponding to the first carrier set) corresponding to the logical channel group i. For a special example in this embodiment, when a logical channel group includes only one logical channel, determining (or configuring) the carrier set $B_i$ corresponding to the i-th logical channel group used by the UE for the sidelink transmission is equivalent to determining (or configuring) the carrier set $B_i$ corresponding to the i-th logical channel used by the UE for the sidelink transmission.

In an optional embodiment, the step in which the second carrier set for the UE performing the sidelink transmission is determined includes following steps: a higher layer of a protocol stack of the UE determines the second carrier set; and the higher layer of the protocol stack of the UE configures the second carrier set to a lower layer of the protocol stack of the UE through an internal interface. In this embodiment, the higher layer of the protocol stack (such as the RRC layer of the UE or the base station) determines the carrier set A (corresponding to the second candidate carrier set) and configures the carrier set A to a lower layer entity (such as an MAC layer or a PHY layer) of the UE through the internal interface or signaling according to the above embodiments.

In an optional embodiment, the step in which the second candidate carrier set corresponding to the predetermined logical channel group is determined according to the carrier sets corresponding to the service types included in the predetermined logical channel group described above includes following steps: the higher layer of the protocol stack of the UE determines the second candidate carrier set according to the carrier sets corresponding to the service types included in the predetermined logical channel group; and the higher layer of the protocol stack of the UE configures the second candidate carrier set to the lower layer of the protocol stack of the UE through the internal interface. The step in which the subset of the intersection set of the second carrier set and the second candidate carrier set is determined as the first carrier set includes following steps: the lower layer of the protocol stack of the UE determines the subset of the intersection set of the second carrier set and the second candidate carrier set as the first carrier set. In this embodiment, the higher layer of the protocol stack determines the candidate carrier set $C_i$ corresponding to the destination $ID_i$ or the logical channel group i according to the method in the above embodiment and configures the candidate carrier set $C_i$ to the lower layer entity of the UE or the UE through the internal interface or the signaling; the lower layer entity of the UE or the UE determines the carrier set $B_i$ (corresponding to the first carrier set) corresponding to the destination $ID_i$ or the logical channel group i used by the UE for the sidelink transmission according to the method in the above embodiment. If multiple destination IDs or logical channel groups are provided, the above operations are performed on each destination ID or the logical channel group.

In an optional embodiment, the step in which the second candidate carrier set corresponding to the predetermined logical channel group is determined according to the carrier sets corresponding to the service types included in the predetermined logical channel group described above includes a following step: the higher layer of the protocol stack of the UE determines the second candidate carrier set according to the carrier sets corresponding to the service types included in the predetermined logical channel group. The step in which the subset of the intersection set of the second carrier set and the second candidate carrier set is determined as the first carrier set includes following steps: the higher layer of the protocol stack of the UE determines the subset of the intersection set of the second carrier set and the second candidate carrier set as the first carrier set, and the higher layer of the protocol stack of the UE configures the first carrier set to the lower layer of the protocol stack of the UE through the internal interface. In this embodiment, the higher layer of the protocol stack determines the candidate carrier set $C_i$ (corresponding to the second candidate carrier set) corresponding to the destination $ID_i$ or the logical channel group i according to the method in the above embodiment and further determines the carrier set $B_i$ (corresponding to the first carrier set) corresponding to the destination $ID_i$ or logical channel group i used by the UE for the sidelink transmission, and configures $B_i$ to the lower layer entity of the UE or the UE through the internal interface or the signaling. If multiple destination IDs or logical channel groups are provided, the above operations are performed on each destination ID or the logical channel group.

In an optional embodiment, the higher layer of the protocol stack of the UE described above includes the RRC layer of the UE, and the lower layer of the protocol stack of the UE includes the MAC layer of the UE or the PHY layer of the UE. In this embodiment, no matter which method in the above embodiment, a specific process of determining (or configuring) the destination $ID_i$ used by the UE for the sidelink transmission or the carrier set $B_i$ (corresponding to the first carrier set) corresponding to the logical channel group i may be as follows: the higher layer of the protocol stack (such as the RRC layer of the UE or the base station) determines the carrier set A according to the above embodiments and configures the carrier set A to the lower layer entity (such as the MAC layer or the PHY layer) of the UE or the UE.

In an optional embodiment, after the first carrier set corresponding to the predetermined logical channel group for the UE performing the sidelink transmission is determined, the method further includes a following step: carrier sets corresponding to logical channels is determined from the first carrier set according to priorities (such as the PPPP) of data packets in the logical channels in the predetermined logical channel group and CBRs of carriers in the first carrier set. In this embodiment, after the carrier set $B_i$ (corresponding to the first carrier set) corresponding to the destination $ID_i$ or the logical channel group i for the sidelink transmission is determined, a carrier set capable of being used by one or more logical channels included in the logical channel group i or corresponding to the destination $ID_i$. Even if the logical channels belong to the same logical channel group, the PPPP corresponding to each logical channel is also different. For example, a logical channel group i includes K logical channels, numbered 1, 2, . . . K, the PPPP in a k-th logical channel is $PPPP_{i,k}$, and the carrier set that may be used by the k-th logical channel is determined according to $PPPP_{i,k}$ and the CBR on each carrier, where this set may be defined as $D_{i,k}$, and $D_{i,k}$ belongs to a subset of $B_i$.

Optionally, the method for determining $D_{i,k}$ is as follows: according to the current technology, the UE may acquire a CBR of a certain carrier. According to a configured CBR-PPPP table, whether a certain logical channel may use a certain carrier is determined. For the data packet or the logical channel of each PPPP, it may correspond to different channel occupancy ratio maximum limit (cr-Limit) and transmission (Tx) parameters (such as a Modulation and Coding Scheme (MCS) and a power) in different CBR ranges. As shown in Table 1, if the PPPP of a certain logical channel does not satisfy the required cr-Limit and the Tx parameters by looking up the table when the CBR of the current carrier is in a certain range, the logical channel may not use the carrier.

TABLE 1

|  | CBR range1 | CBR range2 | . . . | CBR range M |
|---|---|---|---|---|
| PPPP1 | cr-$Limit_{1,1}$<br>$TxParameters_{1,1}$ | cr-$Limit_{1,2}$<br>$TxParameters_{1,2}$ | . . . | cr-$Limit_{1,M}$<br>$TxParameters_{1,M}$ |
| PPPP2 | cr-$Limit_{2,1}$<br>$TxParameters_{2,1}$ | cr-$Limit_{2,2}$<br>$TxParameters_{2,2}$ | . . . | cr-$Limit_{2,M}$<br>$TxParameters_{2,M}$ |
| . . . | . . . | . . . | . . . . . . | . . . |
| PPPP N | cr-$Limit_{N,1}$<br>$TxParameters_{N,1}$ | cr-$Limit_{N,2}$<br>$TxParameters_{N,2}$ | . . . | cr-$Limit_{N,M}$<br>$TxParameters_{N,M}$ |

Each carrier may be configured with one CBR-PPPP table (i.e., Table 1) or all carriers are configured with the same CBR-PPPP table. Moreover, in addition to the above PPPP-CBR table, the carrier that may be used by the logical channel may be limited by other tables or correspondence relations. For example: (1) for a certain carrier, a threshold value of the CBR is configured for each PPPP; if the CBR of the carrier exceeds the threshold value, the logical channel corresponding to the PPPP may not use the carrier; (2) some logical channels cannot be transmitted on the same carrier, for example, two logical channels are used for repeatedly transmitting the same set of data to improve the reliability, thereby this pair of logical channels will be identified, and when the MAC performs resource scheduling, data of these two logical channels must occupy different carriers or carrier sets; (3) the higher layer sets a corresponding carrier set for each logical channel, these carrier sets are all subsets of $B_i$, and the carrier set corresponding to the logical channel may be determined according to the information such as services carried by the logical channel.

Figure 7:
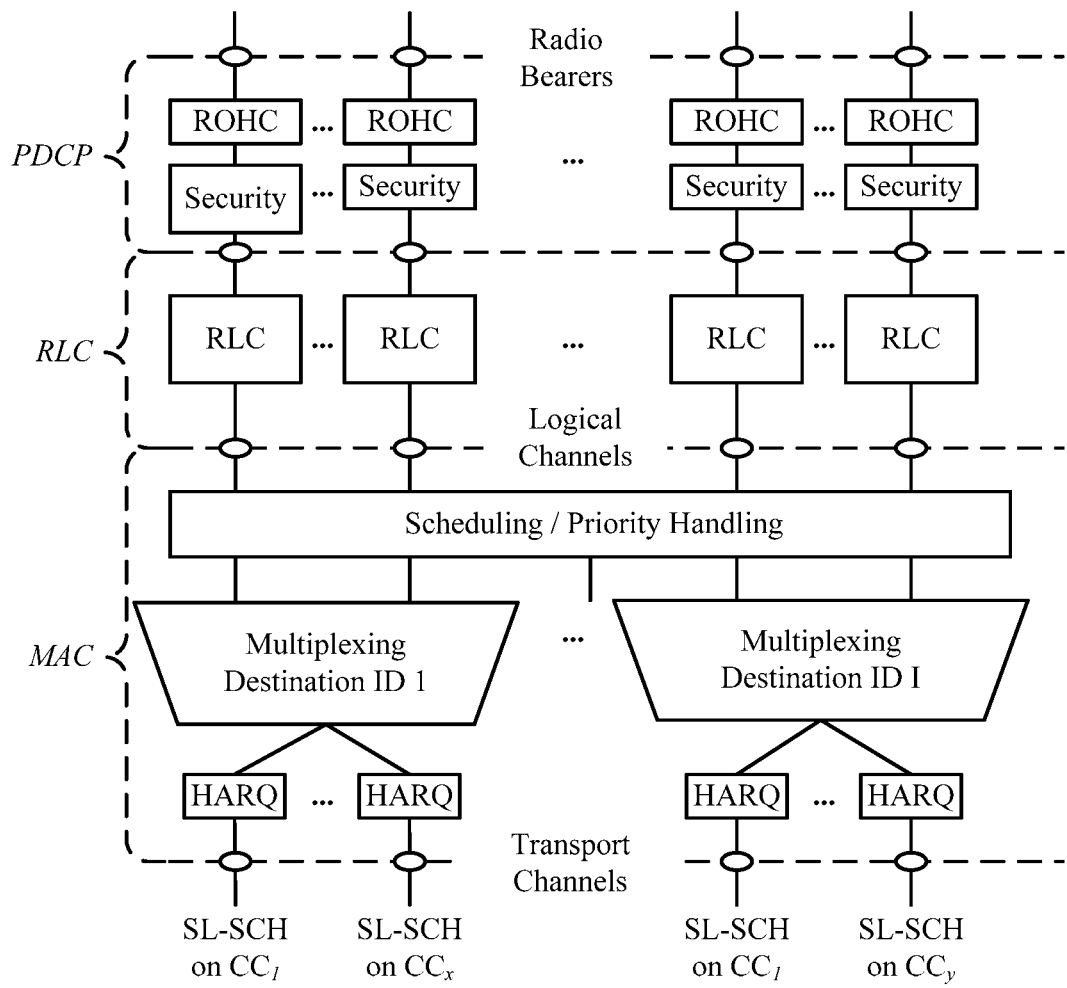
FIG. 7 is a structural diagram of a data plane in sidelink CA according to an optional embodiment of the present disclosure.

In addition, this embodiment is used for describing the structure of the data plane in the sidelink CA described in the present disclosure. As shown in FIG. 7, one logical channel corresponds to one radio link control (RLC) entity and one packet data convergence protocol (PDCP) entity. When used for the sidelink transmission, the main function of the RLC is used for data segmentation, and the PDCP entity is used for operations such as encryption and header compression. At the same time, packets in the same logical channel correspond to the same PPPP and the same destination ID. M logical channels with the same destination ID may be multiplexed by the MAC entity to the same PDU or the same set of PDUs of the MAC layer. It is assumed that the M logical channels are multiplexed to N PDUs located on N carriers. Which specific logical channel is multiplexed to the PDU on which carrier is related to the PPPP of the data packet of the logical channel, the CBR of the carrier, and the carrier set corresponding to the logical channel, which are specifically refer to the method for determining the carrier set. According to the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the technical solutions of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to perform the methods according to the embodiments of the present disclosure.

Embodiment Three

This embodiment further provides an apparatus for determining a carrier set. The apparatus is configured to implement the above-mentioned embodiments and preferred implementation manners. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 8:
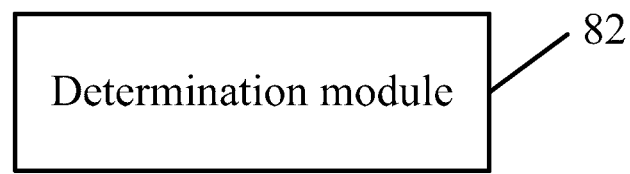
FIG. 8 is a structural block diagram of an apparatus for determining a carrier set according to an optional embodiment of the present disclosure.

FIG. 8 is a structural block diagram of an apparatus for determining a carrier set according to an embodiment of the present disclosure. As shown in FIG. 8, the apparatus includes a determination module 82, which is configured to determine a first carrier set corresponding to a predetermined logical channel group for a UE performing a sidelink transmission. The predetermined logical channel group includes one or more logical channels, and the logical channels in the logical channel group correspond to a same destination ID.

In an optional embodiment, the determination module 82 includes following units: a first determination unit, which is configured to determine a second carrier set for the UE performing the sidelink transmission, and a second determination unit, which is configured to determine the first carrier set from the second carrier set.

In an optional embodiment, the above first determination unit is further configured to determine the second carrier set according to at least one of: a type of a service that needs to be transmitted by the UE; transmission capability of the UE; a type of a service that a carrier is capable of carrying; a CBR on the carrier; synchronization reference information used by the carrier, where the synchronization reference information includes a synchronization reference, a synchronization reference source or a synchronization configuration, or configured to receive the second carrier set from a base station.

In an optional embodiment, each carrier in the second carrier set uses same synchronization reference, the same synchronization reference source or the same synchronization configuration.

In an optional embodiment, the synchronization configuration includes a highest priority synchronization reference type of the carrier, a synchronization reference source type of the carrier or a synchronization reference priority of the carrier.

In an optional embodiment, the above first determination unit is further configured to take carrier sets respectively corresponding to services that need to be transmitted by the UE as a first candidate carrier set; order carriers in the first candidate carrier set according to at least one of the type of the service that the carrier is capable of carrying, the CBR on the carrier, and the synchronization reference information used by the carrier; and select, according to the transmission capability of the UE, a predetermined number of carriers from the ordered first candidate carrier set in sequence as the second carrier set.

In an optional embodiment, the above second determination unit includes following subunits: a first determination subunit, which is configured to determine a second candidate carrier set corresponding to the predetermined logical channel group according to carrier sets corresponding to service types included in the predetermined logical channel group; and a second determination subunit, which is configured to determine a subset of an intersection set of the second carrier set and the second candidate carrier set as the first carrier set.

In an optional embodiment, the above second determination unit is further configured to: determine a second candidate carrier set corresponding to the predetermined logical channel group according to the carrier sets corresponding to the service types included in the predetermined logical channel group; and determine the subset of the intersection set of the second carrier set and the second candidate carrier set as the first carrier set.

In an optional embodiment, the above second determination unit is further configured to: if the destination ID corresponding to the predetermined logical channel group corresponds to one or more service types, and the one or more service types correspond to a same carrier set, determine the second candidate carrier set as a carrier set corresponding to any one of the service types included in the predetermined logical channel group; if the destination ID corresponding to the predetermined logical channel group corresponds to multiple service types, and an interaction set of the carrier sets of the multiple service types included in the predetermined logical channel group is a nonempty set, determine the second candidate carrier set as the interaction set of the carrier sets of the multiple service types included in the predetermined logical channel group; if the destination ID corresponding to the predetermined logical channel group corresponds to multiple service types, determine the second candidate carrier set as a union set of the carrier sets of the multiple service types included in the predetermined logical channel group.

In an optional embodiment, the above first determination unit is further configured to determine, by a higher layer of a protocol stack of the UE, the second carrier set; and configure, by the higher layer of the protocol stack of the UE, the second carrier set to a lower layer of the protocol stack of the UE through an internal interface.

In an optional embodiment, the above first determination subunit is further configured to: determine, by the higher layer of the protocol stack of the UE, the second candidate carrier set according to the carrier sets corresponding to the service types included in the predetermined logical channel group; and configure, by the higher layer of the protocol stack of the UE, the second candidate carrier set to the lower layer of the protocol stack of the UE through the internal interface. The operation of determining the subset of the intersection set of the second carrier set and the second candidate carrier set as the first carrier set includes an operation of: determining, by the lower layer of the protocol stack of the UE, the subset of the intersection set of the second carrier set and the second candidate carrier set as the first carrier set.

In an optional embodiment, the first determination subunit is further configured to: determine, by the higher layer of the protocol stack of the UE, the second candidate carrier set according to the carrier sets corresponding to the service types included in the predetermined logical channel group. The operation of determining the subset of the intersection set of the second carrier set and the second candidate carrier set as the first carrier set includes operations of: determining, by the higher layer of the protocol stack of the UE, the subset of the intersection set of the second carrier set and the second candidate carrier set as the first carrier set; and configuring, by the higher layer of the protocol stack of the UE, the first carrier set to a lower layer of the protocol stack of the UE through the internal interface.

In an optional embodiment, the higher layer of the protocol stack of the UE includes a RRC layer of the UE, and the lower layer of the protocol stack of the UE includes a MAC layer of the UE or a PHY layer of the UE.

In an optional embodiment, the above apparatus is further configured to: after determining the first carrier set corresponding to the predetermined logical channel group for the UE performing the sidelink transmission, determine carrier sets corresponding to logical channels from the first carrier set according to priorities of data packets in the logical channels in the predetermined logical channel group and CBRs of carriers in the first carrier set.

It should be noted that the various modules described above may be implemented by software or hardware. Implementation by hardware may, but may not necessarily, be performed in the following manners: the modules described above are located in a same processor, or the various modules described above are located in different processors in any combination form.

Embodiment Four

An embodiment of the present disclosure further provides a storage medium. The storage medium is configured to store computer programs. The computer programs, when executed, execute the steps of any one of the above-mentioned method embodiments.

Optionally, in this embodiment, the above-mentioned storage medium may be configured to store computer programs for executing a step described below.

In S1, a first carrier set corresponding to a predetermined logical channel group for a UE performing a sidelink transmission is determined. The predetermined logical channel group includes one or more logical channels, and the logical channels in the predetermined logical channel group correspond to a same destination ID.

Optionally, in this embodiment, the above-mentioned storage medium may include, but is not limited to, a Universal Serial Bus (USB) disk, a ROM, a RAM, a mobile hard disk, a magnetic disk, an optical disk or another medium capable of storing computer programs.

An embodiment of the present disclosure further provides an electronic device. The electronic device includes a memory and a processor. The memory is configured to store computer programs and the processor is configured to execute the computer programs for executing the steps in any one of the method embodiments described above.

Optionally, the electronic device described above may further include a transmission device and an input/output device, where both the transmission device and the input/output device are connected to the processor described above.

Optionally, in this embodiment, the processor may be configured to execute a step described below through computer programs.

In S1, a first carrier set corresponding to a predetermined logical channel group for a UE performing a sidelink transmission is determined. The predetermined logical channel group includes one or more logical channels, and the logical channels in the predetermined logical channel group correspond to a same destination ID.

Optionally, for specific examples in this embodiment, reference may be made to the examples described in the above-mentioned embodiments and optional implementations, which are not repeated in this embodiment.

Apparently, it should be understood by those skilled in the art that each of the modules or steps of the present disclosure described above may be implemented by a general-purpose computing device, the modules or steps may be concentrated on a single computing device or distributed on a network composed of multiple computing devices, and alternatively, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software. The above is only preferred embodiments of the present disclosure, and is not intended to limit the present disclosure. In addition, the numbers described in the present disclosure, such as i, j, k, and carrier sets A, B and C are just labeled numbers for convenience of describing the method, only representing its correspondence relation.

The above are only preferred embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure.

INDUSTRIAL APPLICABILITY

Embodiments of the present disclosure provide a method and apparatus for determining a carrier set, a storage medium and an electronic device, which have the following beneficial effects: at least the problem of lacking a method for determining a complete carrier set when a UE performs a sidelink transmission in the related art is solved, and the purpose of determining the carrier set required by the UE for performing the sidelink transmission is achieved.

What is claimed is:

1. A method, comprising:
   determining, by a device, a second carrier set for performing a sidelink communication according to a selection factor;
   determining, by the device, from the second carrier set, a first carrier set corresponding to a logical channel for performing the sidelink communication; and
   selecting, by the device, from the first carrier set, a subset of carriers based on a priority associated with a proximity service priority per packet (PPPP) of data packets in the logical channel.

2. The method of claim 1, wherein the selection factor comprises at least one of: (i) a type of service for the sidelink communication, (ii) a transmission capability of the device, (iii) a channel busy ratios (CBRs) of carriers, or (iv) synchronization reference information.

3. The method of claim 2, wherein the synchronization reference information comprises at least one of: synchronization configuration, synchronization priority, synchronization reference used by a carrier, or a synchronization reference source.

4. The method of claim 1, wherein determining the first carrier set further comprises determining the first carrier set from the second carrier set based on carriers using frequency bands for the sidelink communication.

5. The method of claim 1, wherein selecting the subset of carriers further comprises selecting the subset of carriers based on channel busy ratios (CBRs) of carriers in the first carrier set.

6. The method of claim 1, further comprising using, by the device, a carrier of the subset of carriers for the logical channel, responsive to a channel busy ratio (CBR) of the carrier being less than or equal to a threshold.

7. The method of claim 6, wherein the threshold is configured for the carrier for each PPPP.

8. A device, comprising:
   at least one processor configured to:
      determine a second carrier set for performing a sidelink communication according to a selection factor;
      determine, from the second carrier set, a first carrier set corresponding to a logical channel for performing the sidelink communication; and
      select, from the first carrier set, a subset of carriers based on a priority associated with a proximity service priority per packet (PPPP) of data packets in the logical channel.

9. The device of claim 8, wherein the selection factor comprises at least one of: (i) a type of service for the sidelink communication, (ii) a transmission capability of the device, (iii) a channel busy ratios (CBRs) of carriers, or (iv) synchronization reference information.

10. The device of claim 9, wherein the synchronization reference information comprises at least one of: synchronization configuration, synchronization priority, synchronization reference used by a carrier, or a synchronization reference source.

11. The device of claim 8, wherein the at least one processor is configured to determine the first carrier set from the second carrier set based on carriers using frequency bands for the sidelink communication.

12. The device of claim 8, wherein the at least one processor is configured to select the subset of carriers based on channel busy ratios (CBRs) of carriers in the first carrier set.

13. The device of claim 8, wherein the at least one processor is configured to use a carrier of the subset of carriers for the logical channel, responsive to a channel busy ratio (CBR) of the carrier being less than or equal to a threshold.

14. The device of claim 13, wherein the threshold is configured for the carrier for each PPPP.

15. A system, comprising:
a wireless communication device having one or more processors, configured to:
determine a second carrier set for performing a sidelink communication according to a selection factor;
determine, from the second carrier set, a first carrier set corresponding to a logical channel for performing the sidelink communication; and
select, from the first carrier set, a subset of carriers based on a priority associated with a proximity service priority per packet (PPPP) of data packets in the logical channel.

16. The system of claim 15, wherein the selection factor comprises at least one of: (i) a type of service for the sidelink communication, (ii) a transmission capability of the device, (iii) a channel busy ratios (CBRs) of carriers, or (iv) synchronization reference information.

17. The system of claim 16, wherein the synchronization reference information comprises at least one of: synchronization configuration, synchronization priority, synchronization reference used by a carrier, or a synchronization reference source.

18. The system of claim 15, wherein the wireless communication device is further configured to determine the first carrier set from the second carrier set based on carriers using frequency bands for the sidelink communication.

19. The system of claim 15, wherein the wireless communication device is further configured to select the subset of carriers based on channel busy ratios (CBRs) of carriers in the first carrier set.

20. The system of claim 15, wherein the wireless communication device is further configured to use a carrier of the subset of carriers for the logical channel, responsive to a CBR of the carrier being less than or equal to a threshold.

* * * * *